Jan. 7, 1930. W. A. PARSONS 1,742,485
CONVERTIBLE BASKET TRUCK
Filed June 20, 1927 3 Sheets-Sheet 2

INVENTOR
William A. Parsons
BY
Erwin Wheeler & Woolard
ATTORNEY

Jan. 7, 1930.   W. A. PARSONS   1,742,485
CONVERTIBLE BASKET TRUCK
Filed June 20, 1927   3 Sheets-Sheet 3
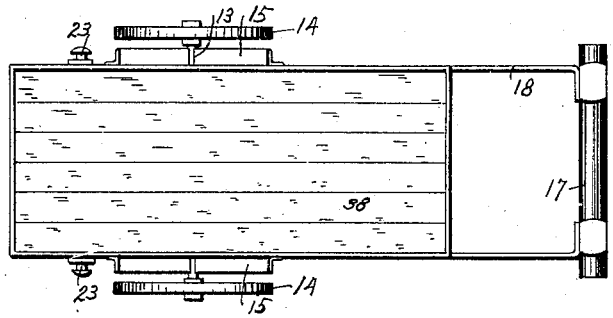
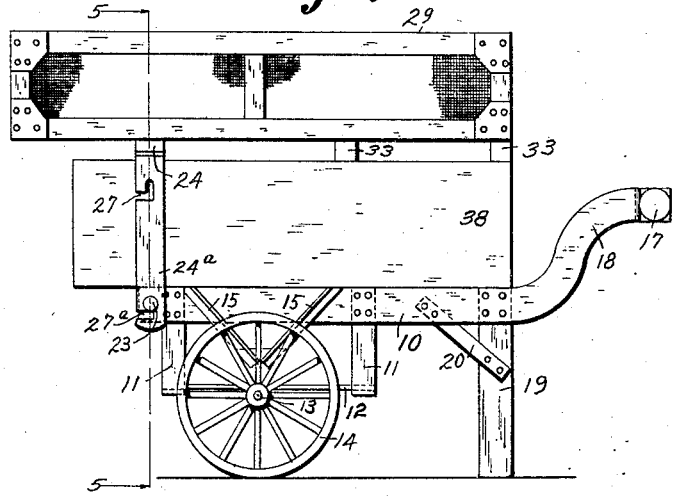
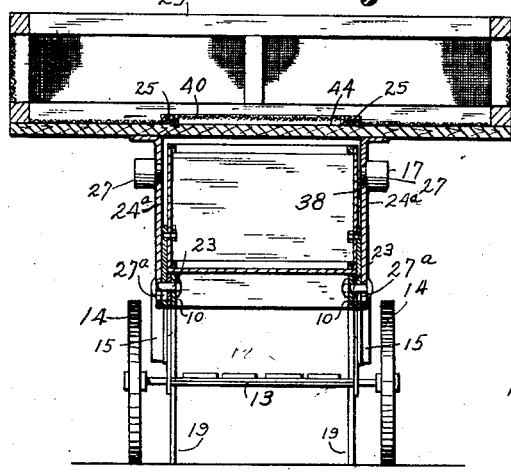
INVENTOR
William A. Parsons
BY
Erwin Wheeler & Woolard
ATTORNEYS Patented Jan. 7, 1930

1,742,485

UNITED STATES PATENT OFFICE

WILLIAM A. PARSONS, OF FORT ATKINSON, WISCONSIN

CONVERTIBLE BASKET TRUCK

Application filed June 20, 1927. Serial No. 200,031.

This invention relates to improvements in convertible basket trucks.

Objects of this invention are to provide means to facilitate the transportation of material of varying weight and bulk under power manually applied and to also facilitate the dumping of such material, the quick adaptation of the apparatus to the desired purpose, and convenience in handling materials of various kinds required to be manually handled and transported upon a farm or in any analogous situation.

More particularly stated, the object of this invention is to provide a two-wheeled manually operable truck which can be utilized for conveying small loads of straw, hay, leaves and bulky débris of light weight with minimum expenditure of manual labor or strength; to provide means whereby the material so carried may be easily delivered by a dumping operation and whereby the carrying capacity of the truck may be quickly varied in proportion to the load or with reference to the relative weight of the material in proportion to its bulk; to provide means whereby such a truck may be adapted to pass through either wide or narrow openings or gateways in accordance with the requirements of any given situation; and in general to provide a general purpose hand truck suitable for all purposes wherein an ordinary hand truck or wheelbarrow might be otherwise available.

In the drawings:

Figure 3 is a view similar to Figure 2, (reduced) showing the truck equipped with an interchangeable body substituted for the body shown in Figures 1 and 2.

Figure 4 is a side elevation on a reduced scale showing a further modification of a body interchangeable with those shown in Figures 1, 2 and 3.

Figure 5 is a sectional view of the apparatus as shown in Figure 4, drawn to line 5—5 of Figure 4.

Like parts are identified by the same reference characters throughout the several views.

Figure 1:
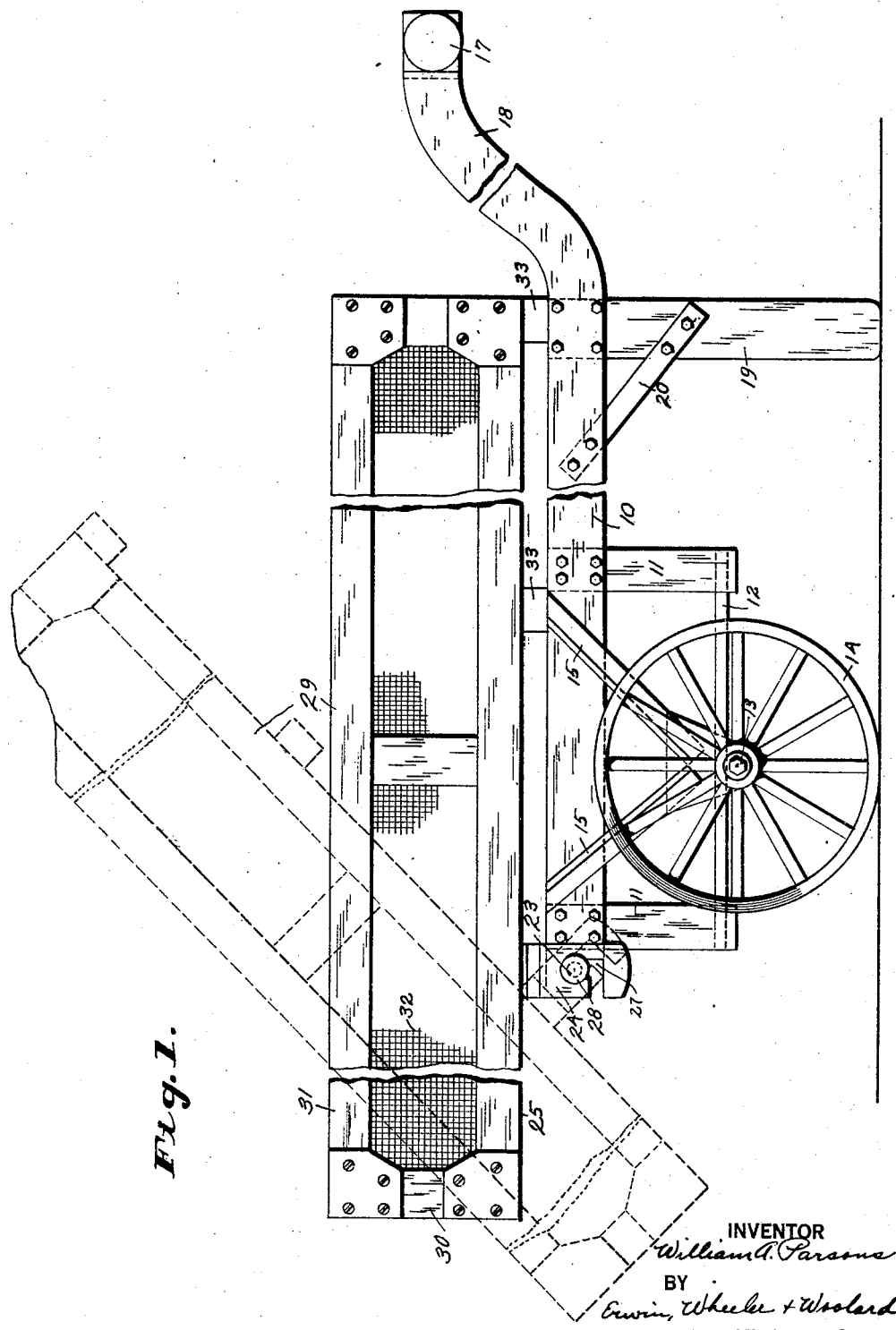
Figure 1 is a side elevation of my improved truck as it appears when equipped with a straw carrying body, such body being also illustrated by dotted lines as it appears while being tilted for dumping operation.

The main frame 10 of the truck is provided with hangers 11 which support frame bars 12 in positions parallel with the frame 10. A one-piece axle 13 is employed to support the bars 12 and the wheels 14 are journaled on the ends of this axle. The hangers 11 and bars 12 form a boxlike truck body to support milk cans and other weighty objects. The central or axle receiving portions of the bars 12 are re-enforced by oblique braces 15 which are secured to the sides of the main frame 10 and converge downwardly to the sub-frame or axle supporting frame represented by the bars 11 and 12, whereby maximum strength in proportion to weight may be obtained. The main frame extends in one direction from the sub-frame,—in the direction of a suitable handle 17, the handle bars 18 being upwardly curved as clearly shown in Figure 1 and the end of the frame 10 to which the handle bars are attached is provided with legs 19 suitably braced by braces 20, the legs and braces being secured by bolts or screws as illustrated.

At the opposite end of the frame 10, studs 23 are secured to the side bars adjacent to the associated sub-frame bars 11. The ends of the studs 23 project beyond the sides of the frame 10 and serve as pivot studs adapted to receive depending brackets 24 which are secured to longitudinally extending bottom bars 25 of the body. The brackets 24 are provided with L-shaped slots 27 which receive the pivot studs or projections 23, such studs first entering the horizontal portions of the slots and then the vertical portions when in registry therewith, the body being allowed to move downwardly until the pivot studs or rod are received at the upper ends of the vertical portions of the slots. If desired the ends of the shaft 23 may be suitably capped as indicated at 28 in Figure 2 although the brackets will be so spaced that the sides of the main frame 10 will prevent lateral movement of the box sufficiently to permit a release of either bracket.

The body 29 employed for conveying straw and other bulky material of light weight will be formed with an open skeleton frame of which the bars 25 form a part. The frame members 25, 30 and 31 will be connected at the sides and ends by a metallic screen or reticulated wall 32, whereby a box or body of great carrying capacity and light weight may be constructed. The portion of the body extended in the direction of the handle 17 from a vertical plane through the pivot shaft 23 is of materially greater length than that which projects rearwardly so that the center of gravity of the body will be located substantially above the axle 13. The end provided with the handle 17 may for convenience in description be termed the front end, although the vehicle will ordinarily be pushed by means of the handle in advance of the person using it. The front end of the body may be provided with one or more supporting blocks 33 which may be conveniently attached to the under surfaces of the bars 25 in a position to rest upon the side bars 10 of the main frame with the body projecting laterally on each side to a considerable distance beyond the ends of the axle 13 as clearly illustrated in Figure 2.

In use, the truck may be supported by the wheels 14 and legs 19 when being loaded, the handle 17 being lifted to remove the legs 19 from the ground when transporting the load. If it is desired to dump the load, a further movement of the handle 17 upwardly will cause the center of gravity to shift rearwardly until the body automatically swings to dumping position over the pivot studs 23, this swinging movement being facilitated by a quick upward movement of the handle 17 while the truck is in motion in the direction in which the load dumps.

Figure 2:
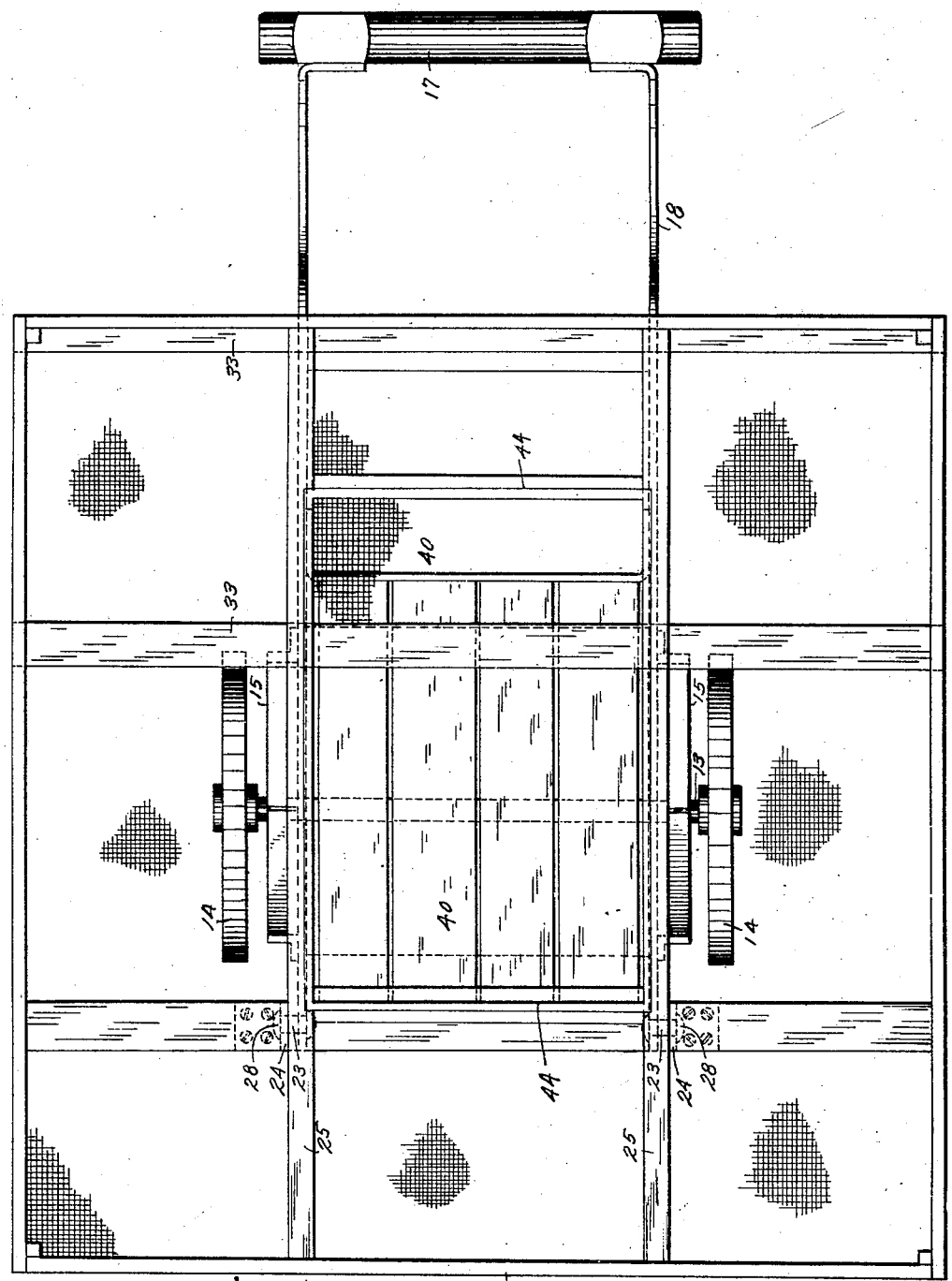
Figure 2 is a plan view of the same.

To convert the truck from a straw carrying truck to a truck adapted to be used for other purposes, the body shown in Figures 1 and 2 may be lifted until the pivot rod 23 is in registry with the horizontal portions of the slots 27, whereupon a slight forward movement of the body in the direction of the handle will release it. Thereupon a body 38 of smaller capacity and having solid walls may be substituted as illustrated in Figure 3, such body being equipped with brackets 24 like those connected with the body shown in Figure 1.

It is sometimes desirable to employ a box having solid walls for carrying certain materials and a superposed body of greater capacity for carrying light materials simultaneously and in Figures 4 and 5 I have illustrated means for adapting my invention to such purposes. In these views, a box similar to the box 38 shown in Figure 3 is employed and associated therewith is a body having a skeleton frame and foraminous walls similar to those shown in Figure 1, but having elongated brackets 24ª which are provided with two sets of slots 27 and 27ª similar to those of the bracket shown in Figure 1 and spaced vertically in correspondence with the vertical dimensions of the box 38. These brackets 24ª are so spaced laterally that they may engage with the pivot rod 23 in close proximity to the engagement of the brackets 24 attached to the box 38, whereby both boxes or bodies may be simultaneously and pivotally connected to the same pivot studs 23. The box or body 29 rests upon the upper margins of the box or body 38 and the central portion of its bottom above the box 38 will preferably be provided with an opening 44 through which materials may pass into the box 38 preparatory to filling the upper box or body 29. This opening may be covered, when desired by a removable screen 40.

From the foregoing description, it will be observed that I have provided a simple and inexpensive hand truck which may be easily and quickly converted into a straw carrying truck, earth carrying truck, or a combination truck simultaneously adapted for both purposes. Great importance is attached to the fact that the bodies are connected with the main frame of the truck at only two points and are quickly detachable by a simple manipulation whereby simplicity, economy in cost of construction, durability, and quick convertibility are attained and whereby the dumping operation is expedited.

It will be understood that the brackets 24 on the body 29 will be spaced a little differently,—either more widely or more narrowly than the brackets 24ª on the body 38 whereby when the two bodies are used simultaneously the brackets may engage the pivotal studs or ends of the cross shaft or rod 23 between the head caps and the bars 25 without interfering with each other. It will also be observed that the sub-frame bars 11 are secured to the main frame 10 on the inner side of its side bars, whereas the brackets 24 and 24ª are on the outer side of these bars. Therefore, the lower ends of the brackets 24 will be free to swing when the body 29 is being used alone with the pivot studs engaged in the upper slots 27.

I claim:

1. A manually operable two-wheeled truck having a main frame medially supported from the truck axle with body supporting members above the wheels and provided at one end with laterally extending trunnions, a body supported from said main frame members above the wheels of the truck and extending laterally to a substantial distance at the respective sides of the wheels, said body being provided with depending brackets having L-shaped slots adapted to receive said trunnions to pivotally connect the body with the main frame in a position to facilitate dumping operations, said body being otherwise unconnected with the other portions of the truck and having its center of gravity over the main frame and its rear end projecting rearwardly over said pivotal connections, whereby the body tends normally to assume a horizontal position on such frame.

2. In a convertible manually operable truck, a truck body having a skeleton frame, foraminous walls and a central longitudinally extending opening, a second narrower body having side and end walls of dimensions substantially corresponding to the dimensions of the marginal portions of the first mentioned body about said opening, depending brackets connected with the respective bodies and adapted when said bodies are superposed, to be engaged by manipulation with a single pair of pivot studs, and a two-wheeled truck frame provided with a pair of pivot studs adapted to be engaged with the brackets of either of the bodies, and with those of the first mentioned body when the latter is used independently and also when it is superposed upon the narrower truck body.

3. In a convertible, manually operable two-wheel truck having a truck frame with body supporting members above the wheels, the combination with such frame of a truck body of greater width and length than the frame, and provided near its rear end with depending brackets connected to its bottom intermediate of its side walls, said brackets being spaced from each other at a distance slightly greater than the width of the frame and adapted for detachable pivotal interlocking connection with the frame at two different levels whereby said body may be either supported directly upon said main frame in one such pivotal connection, or at a greater vertical distance therefrom to permit the use of an interposed body.

4. In a convertible, manually operable truck, the combination of a pair of truck bodies of different widths and provided with depending brackets, arranged with the brackets of the upper body spaced from each other at a slightly greater distance than the width of the lower body, said upper body brackets being of a length and position to extend downwardly along the sides of the respective brackets on the lower body for pivotal connection in common with the main frame, said main frame having pivotal studs adapted to be detachably engaged with said brackets.

5. In a convertible, manually operable truck, the combination of a pair of truck bodies of different widths and provided with depending brackets, arranged with the brackets of the upper body spaced from each other at a slightly greater distance than the width of the lower body, said upper body brackets being of a length and position to extend downwardly along the sides of the respective brackets on the lower body for pivotal connection in common with the main frame, said main frame having pivotal studs adapted to be detachably engaged with said brackets, and the brackets of the upper body being also provided with means for engagement with said pivotal studs at a plurality of points vertically spaced from each other.

WILLIAM A. PARSONS.